US012202282B2

(12) United States Patent
Liao et al.

(10) Patent No.: US 12,202,282 B2
(45) Date of Patent: Jan. 21, 2025

(54) COVER STATE SENSING MECHANISM FOR MEDIA PROCESSING DEVICES

(71) Applicant: ZEBRA TECHNOLOGIES CORPORATION, Lincolnshire, IL (US)

(72) Inventors: Huanhua Liao, Guanghzou (CN); Yunbo Yuan, Guangzhou (CN); Zhong Gui Wang, Guangzhou (CN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/607,188

(22) Filed: Mar. 15, 2024

(65) Prior Publication Data

US 2024/0217250 A1 Jul. 4, 2024

Related U.S. Application Data

(63) Continuation of application No. 17/633,908, filed as application No. PCT/CN2021/076347 on Feb. 9, 2021, now Pat. No. 11,932,027.

(51) Int. Cl.

| | |
|---|---|
| *B41J 29/13* | (2006.01) |
| *B41J 3/407* | (2006.01) |
| *B41J 29/02* | (2006.01) |

(52) U.S. Cl.
CPC ............ *B41J 29/02* (2013.01); *B41J 3/4075* (2013.01); *B41J 29/13* (2013.01)

(58) Field of Classification Search
CPC ........... B41J 29/02; B41J 3/4075; B41J 29/13
See application file for complete search history.

(56) References Cited

U.S. PATENT DOCUMENTS

2010/0089535 A1* 4/2010 Hosono ................ B65C 9/0006 156/719
2017/0036469 A1* 2/2017 Katayama ............. B41J 3/4075

* cited by examiner

*Primary Examiner* — Julian D Huffman

(57) ABSTRACT

A media processing device includes: a housing; a cover rotatable between open and closed positions; a main logic board (MLB) supporting a controller, and having a slot extending into the MLB from an open end at a perimeter of the MLB, the slot traversing the MLB from an upper surface to a lower surface; a receiver affixed to the MLB on a first side of the slot, and an emitter affixed to the MLB on a second side of the slot, to emit radiation detectable by the receiver; and a tab movably coupled to the housing, to obstruct the slot and prevent detection of the radiation by the receiver when the cover is in a first one of the open and closed positions, and to clear the slot and permit detection of the radiation by the receiver when the cover is in the other of the open and closed positions.

8 Claims, 4 Drawing Sheets

COVER STATE SENSING MECHANISM FOR MEDIA PROCESSING DEVICES

RELATED APPLICATIONS

The present application is a continuation of U.S. patent application Ser. No. 17/633,908, filed on Feb. 8, 2022, which a 35 U.S.C 371 application of International Patent Application PCT/CN2021/076347, filed on Feb. 9, 2021, each of which are incorporated by reference herein in their entirety.

BACKGROUND

Media processing devices such as label printers may include covers, e.g. that can be opened to access the interior of the device, install a supply of media, or the like. Such devices may include sensors to detect when the cover is open, e.g. in order to interrupt media processing until the cover is closed. Such sensors may add cost and complexity to the devices, however.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
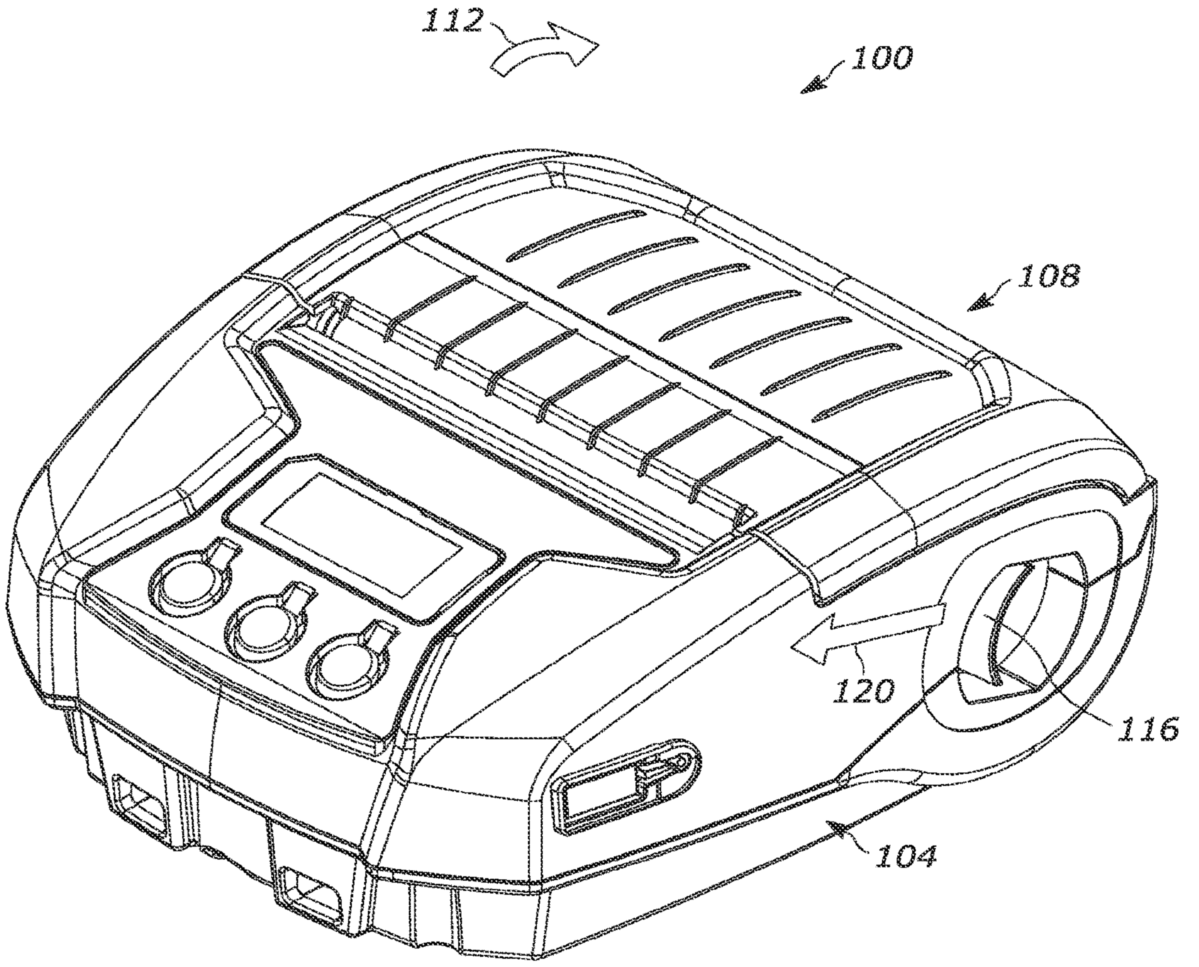
FIG. 1 is an isometric view of a media processing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a media processing device, comprising: a housing; a cover rotatable relative to the housing between an open position and a closed position; a main logic board (MLB) supporting a controller, and having a slot extending into the MLB from an open end at a perimeter of the MLB, the slot traversing the MLB from an upper surface to a lower surface; a sensor assembly including (i) a receiver affixed to the MLB on a first side of the slot, and (ii) an emitter affixed to the MLB on a second side of the slot, configured to emit radiation detectable by the receiver; and a tab movably coupled to the housing, to (i) obstruct the slot and prevent detection of the radiation by the receiver when the cover is in a first one of the open and closed positions, and to (ii) clear the slot and permit detection of the radiation by the receiver when the cover is in the other of the open and closed positions.

Additional examples disclosed herein are directed to a main logic board (MLB) for a media processing device, the MLB comprising: a support member having an upper surface, an opposing lower surface, and a plurality of edges defining a perimeter; a slot extending into the support member from an open end at the perimeter, the slot traversing the board from an upper surface to a lower surface, and configured to accommodate a movable tab; a controller affixed to one of the upper surface and the lower surface; and a sensor assembly including (i) a receiver affixed to the main board on a first side of the slot, and (ii) an emitter affixed to the main board on a second side of the slot, configured to emit radiation detectable by the receiver; the receiver configured to send a signal to the controller indicating whether the slot is obstructed by the tab, based on whether receiver detects the radiation.

FIG. 1 illustrates a media processing device 100, such as a portable printer for generating labels, receipts, and the like. The device 100 includes a housing 104 that defines an enclosure to contain a supply of media (e.g. a spool of labels, paper or the like), and also contains various other components of the device 100, such as rollers, motors and the like to manipulate the media and apply indicia thereto by any suitable technology (e.g. thermal printing, ink, or the like).

The enclosure mentioned above can be accessed via a cover 108 coupled to the housing 104 and rotatable relative to the housing 104 in a direction 112 to open and permit access to the enclosure. The cover 108 is further movable in a direction opposite to the direction 112 to return to the illustrated closed position. As will be discussed below, the cover 108 may be retained in the closed position by a latching mechanism, which can be released to enable opening of the cover 108 by an actuator 116. The actuator 116 is slidable in a direction 120 to unlatch the cover 108 and permit the cover 108 to open. As will be apparent to those skilled in the art, a wide variety of other latching and release mechanisms may be employed to permit or prevent the cover 108 from opening.

Figure 2:
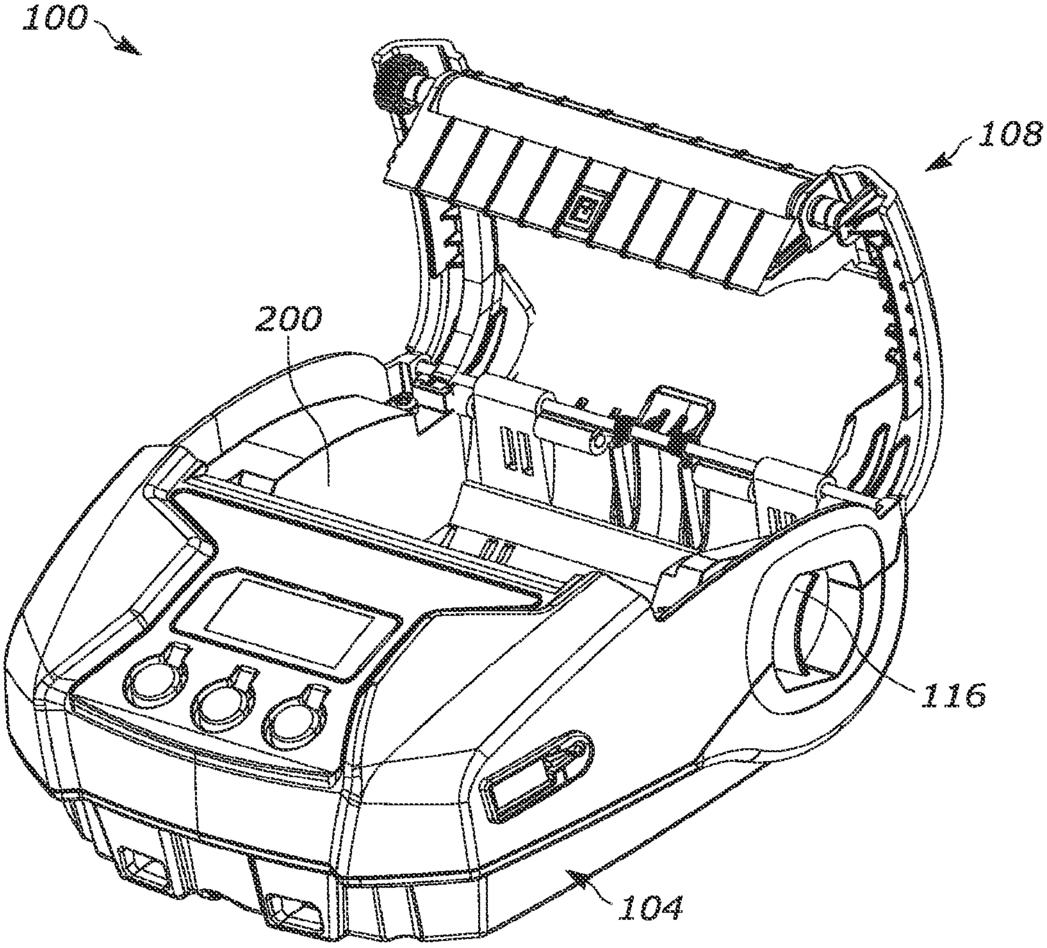
FIG. 2 is an isometric view of the media processing device of FIG. 1 with an open cover.

FIG. 2 illustrates the device 100 with the cover 108 in an open position, revealing the above-mentioned enclosure 200. As will be described in greater detail herein, the device 100 also includes a sensing mechanism for detecting whether the cover 108 is in the closed position shown in FIG. 1, or the open position shown in FIG. 2. As will be apparent to those skilled in the art, the state of the cover 108 may be employed for various control actions taken by the device 100. For example, an alert, notification or the like may be generated when the cover 108 is open. Further, print actions are generally prevented from beginning until the cover 108 is in the closed position.

Figure 3:
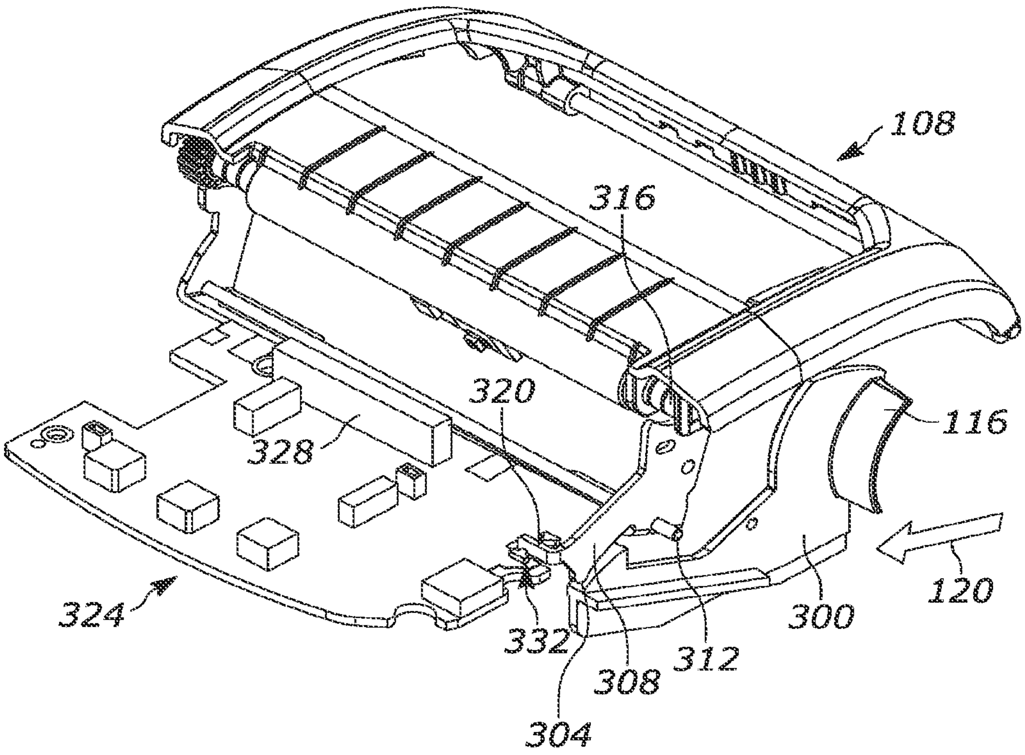
FIG. 3 is an isometric view of certain internal components of the media processing device of FIG. 1.

Turning to FIG. 3, certain portions of the device 100 are shown, with the housing 104 omitted. In particular, the cover 108 is shown in the closed position, and the above-mentioned latching mechanism (consisting of the actuator 116, a plate 300 carrying the actuator 116, and a latching and sensing arm 308, described below) is visible, as is the sensing mechanism.

The latching mechanism includes the actuator 116 mentioned above, which extends from a slidable plate 300 supported within the housing 104. The plate 300 and actuator 116 are slidable in the direction 120 to impact with a lower end 304 of a latching and sensing arm 308 (also referred to simply as the arm 308). The arm 308 is rotatably supported within the housing 104 about an axis 312. As will now be apparent, sliding of the plate 300 in the direction 120 causes the arm 308 to rotate about the axis 312 in a clockwise direction (in the orientation illustrated in FIG. 3). Such rotation of the arm 308 releases a roller 316 on the cover 108 from a latch at an upper end of the arm 308, permitting the cover 108 to open.

In addition to the latching function noted above, the arm 308 includes a tab 320 extending towards an interior of the device 100. In particular the tab 320 is configured to obstruct, in certain positions, a sensing mechanism integrated with a main logic board (MLB) 324 of the device 100. The MLB 324 can be, for example, a printed circuit board (PCB) carrying various other components of the device 100, such as motor interfaces, input devices, and the like. Such components include a controller 328 configured to control the overall operation of the device 100 by receiving input from the input devices, issuing commands via the motor interfaces, and the like.

The MLB 324 also carries a sensing mechanism 332. Specifically, the sensing mechanism 332 implements a gap sensor, e.g. an optical gap sensor, directly on the MLB 324, rather than through a distinct component coupled to the MLB 324 (e.g. via a cable or the like). As will be shown below, the gap sensor is defined by a slot cut into the perimeter of the MLB 324, and a pair of sensor components disposed directly on the MLB 324, for example via surface-mount technology (SMT) on either side of the slot.

The tab 320, as a result of the rotation of the arm 308, travels between positions on either side of the slot in the MLB 324. Thus, in some positions, such as that shown in FIG. 3 when the cover 108 is closed, the tab 320 obstructs the slot of the sensing mechanism 332. Such an obstruction is detected by the sensing mechanism 332 and reported to the controller 328. When the cover 108 is open, the arm 308 is positioned such that the tab 320 does not obstruct the slot of the sensing mechanism 332, and the sensing mechanism 332 therefore transmits to the controller 328 a signal indicating a different state than when the slot is obstructed. The distinct states of the sensing mechanism 332 correspond to distinct open and closed states of the cover 108.

Figure 4:
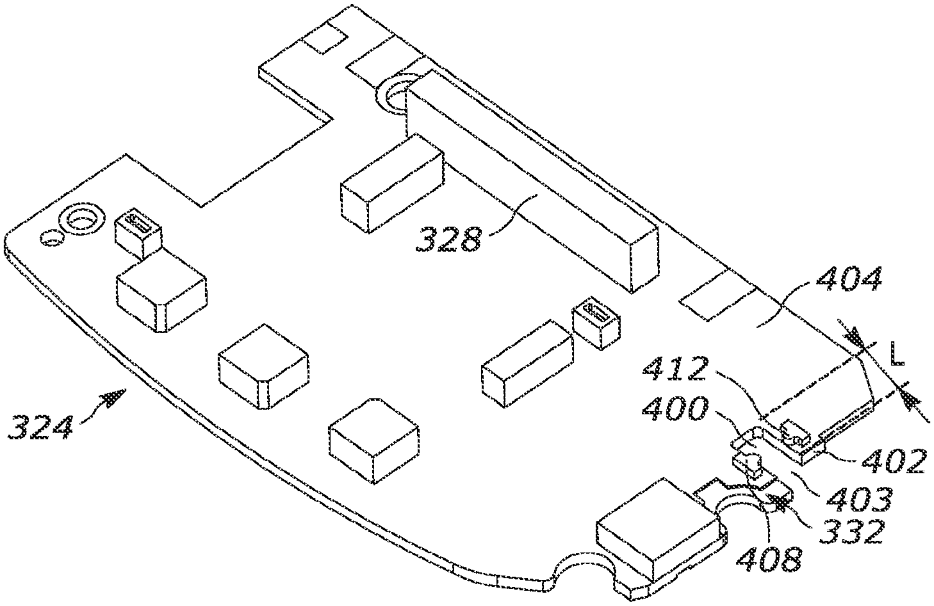
FIG. 4 is a diagram of a main logic board (MLB) and cover state sensing mechanism of the media processing device of FIG. 1.

FIG. 4 illustrates the MLB 324 in isolation to further illustrate the sensing mechanism 332. As noted above, the sensing mechanism 332 includes a slot 400 traversing the MLB 324 from an upper surface 404 to an opposite lower surface thereof. That is, the slot 400 traverses the entire thickness of the MLB 324. The slot 400 extends into the MLB 324 from a perimeter 402 of the MLB 324, such that the slot 400 has an open end 403 at the perimeter 402, and a closed interior end.

The sensing mechanism 332 also includes a sensor assembly including a receiver 408 affixed to the MLB 324 on a first side of the slot 400, and an emitter 412 affixed to the MLB 324 on a second side of the slot 400. The emitter 412 is configured to emit radiation detectable by the receiver 408. For example, the emitter 412 can be a light-emitting diode (LED), and the receiver 408 can be a phototransistor or other light-sensitive component. The receiver 408 and emitter 412 can also be mounted to the MLB 324 on opposite sides of the slot 400 than the arrangement shown in FIG. 4.

The receiver 408 and the emitter 412 are mounted on the upper surface 404 of the MLB 324 in this example. In other examples, the receiver 408 and emitter 412 may be mounted on the lower surface of the MLB 324. Because the receiver 408 and emitter 412 are affixed directly to the MLB 324, rather than being connected to the MLB 324 via a separate structure (e.g. a secondary PCB with a cable connector to the MLB 324), the manufacture and assembly of the device 100 may be simplified. The receiver 408 and emitter 412 can be affixed to the MLB 324 via surface-mount technology (SMT) or other suitable PCB fabrication processes.

The slot 400, in this example, has a length L (extending from the open end 403 to the closed end, or perpendicular to the edge of the MLB 324 containing the slot) that is greater than a width of the slot 400 (i.e. the shortest distance between the receiver 408 and the emitter 412, in a direction parallel to the above-mentioned edge). That is, the slot 400 has a generally rectangular shape in this example. In other examples, the slot 400 may be implemented with a different shape and relative dimensions than those shown, however.

Because light or other electromagnetic radiation from the emitter 412 traverses the slot 400 before detection by the receiver 408, the tab 320 can obstruct such radiation from reaching the receiver 408. In other words, when the tab 320 obstructs the slot 400 (i.e. lies between the upper surface 404 and the opposing lower surface of the MLB 324, and between the receiver 408 and emitter 412), the receiver 408 detects less or no light from the emitter 412 and generates a first signal. When the tab 320 does not obstruct the slot 400, the receiver 408 detects more light from the emitter 412, and generates a second signal. The above signals are transmitted to the controller 328 as indications of the current state of the cover 108. Such transmission, as will be apparent, need not travel via discrete connectors between the MLB 324 and other components. Instead, at least one of the receiver 408 and the emitter 412 can be connected to the controller 328 via circuit traces or other components integrated with the MLB 324 and extending directly to the receiver 408 and/or emitter 412. The controller 328 may then use the cover state to control operations of the device 100.

As will now be apparent, the slot 400 is shaped and sized to enable passage of the tab 320, which extends into the slot 400 from a given side of the MLB 324. In other examples, dependent on the shape and installed position of the tab 320, the slot 400 can take a wide variety of other shapes and sizes, and can be located along various other portions of the perimeter 402 of the MLB 324.

Figure 5A:
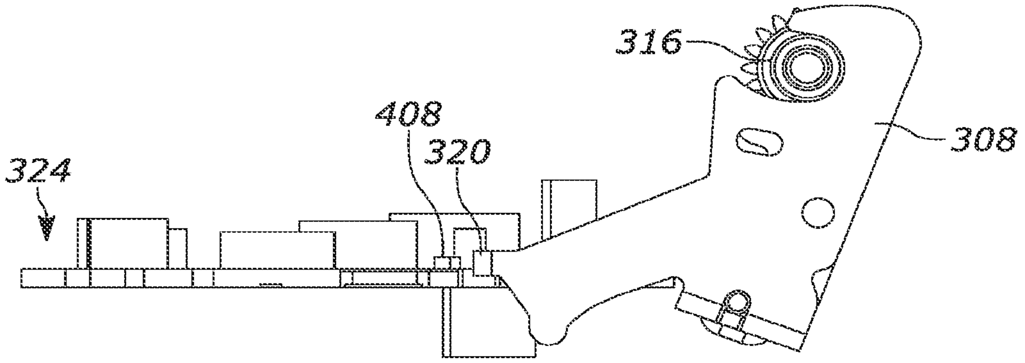
FIGS. 5A, 5B, and 5C are side views of a latching and sensing mechanism of the media processing device of FIG. 1.
Figure 5B:
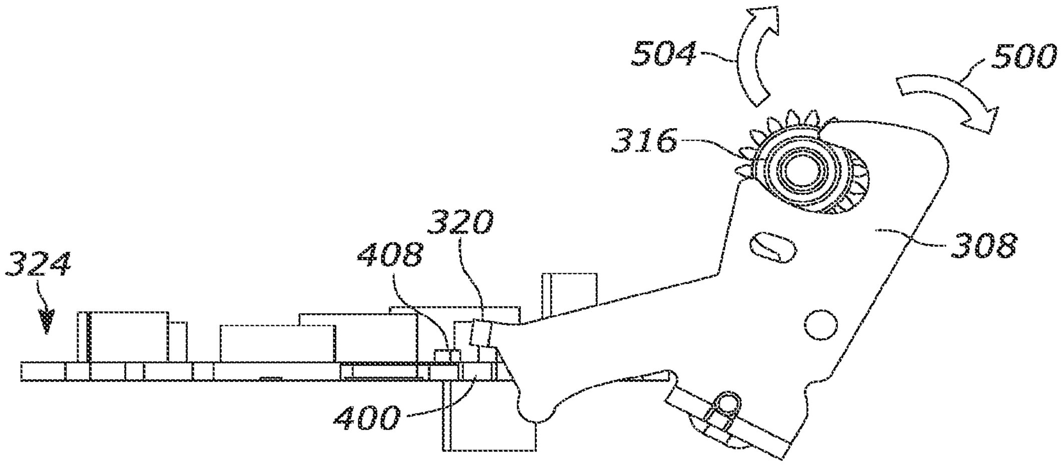
Figure 5C:
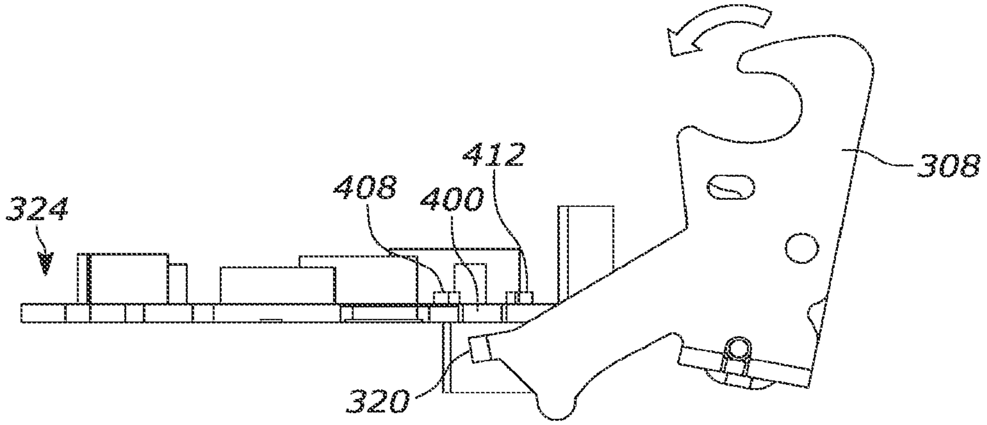

Turning to FIGS. 5A, 5B, and 5C, the action of the latching mechanism and cover state sensing implemented by the arm 308 and the sensing mechanism 332 are illustrated. As shown in FIG. 5A, when the cover 108 is in the closed position, a latch at the upper end of the arm 308 retains the roller 316 of the cover 108, preventing the cover 108 from opening. In addition, the tab 320 obstructs at least a portion of the slot 400, including the space between the receiver 408 and the emitter 412. The receiver 408 therefore receives little or no light from the emitter 412, and generates a first state signal for transmission to the controller 328.

As shown in FIG. 5B, in response to manipulation of the actuator 116, the arm 308 is rotated in the direction 500, releasing the roller 316 from the latch mentioned above. The cover 108 may include a torsion spring or other bias element biasing the cover 108 towards the open position, and thus once released, the cover 108 rotates in the direction 112 towards the open position. As also seen in FIG. 5B, the tab 320 no longer obstructs the slot 400 or the space between the receiver 408 and the emitter 412. In this example, the arm 308 is biased in a direction opposite the direction 500 (e.g. via a coil spring between the arm 308 and an internal portion of the housing 104), and therefore when the actuator 116 is released, the arm 308 comes to rest in the position shown in FIG. 5C.

FIG. 5C illustrates the resting position of the arm 308 when the cover 108 is in the open position. As shown in FIG. 5C, the tab 320 has traversed the slot 400 and come to rest outside the slot on a lower side of the MLB 324. In other words, the tab 320 has cleared the slot 400 rather than obstructing it. The space between the receiver 408 and the emitter 412 is therefore unobstructed, and the receiver 408 generates a second state signal for transmission to the controller 328. When the cover 108 closes, the roller 316 displaces the arm 308 back to the position shown in FIG. 5A.

Although the examples above involve the obstruction of the slot 400 corresponding to closure of the cover 108, in other examples the tab 320 may be positioned such that obstruction of the slot indicates that the cover 108 is open, and clearance of the slot indicates that the cover 108 is closed.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processing device, comprising:

a housing;

a cover rotatable relative to the housing between an open position and a closed position, the cover including a roller;

a main logic board (MLB) supporting a controller, and having a slot extending into the MLB from an open end at a perimeter of the MLB, the slot traversing the MLB from an upper surface to a lower surface;

a sensor assembly including (i) a receiver affixed to the MLB on a first side of the slot, and (ii) an emitter affixed to the MLB on a second side of the slot, configured to emit radiation detectable by the receiver;

a latching mechanism including an actuator and a slidable plate; and an arm rotatably supported about an axis within the housing, the arm retaining the roller when the cover is in the closed position and releasing the roller to allow the cover to move to the open position, the arm including a tab to (i) obstruct the slot and prevent detection of the radiation by the receiver when the cover is in a first one of the open and closed positions, and to (ii) clear the slot and permit detection of the radiation by the receiver when the cover is in the other of the open and closed positions, wherein when cover is in the closed state, the slidable plate slides in response to actuation of the actuator and causes the arm to rotate in a first direction about the axis releasing the roller from the arm, and after the roller is released from the arm, the arm rotates about the axis in the second direction to cause the tab to come to rest outside of the slot on a lower side of the MLB.

2. The media processing device of claim 1, wherein the emitter and the receiver are on the same one of the upper and lower surface of the MLB.

3. The media processing device of claim 1, wherein the emitter includes a light emitting diode.

4. The media processing device of claim 1, wherein the receiver includes a phototransistor.

5. The media processing device of claim 1, wherein the first one of the positions is a closed position.

6. The media processing device of claim 1, wherein the MLB carries a controller; and wherein the receiver is connected with the controller via at least one circuit trace.

7. The media processing device of claim 1, wherein the slot is a rectangular slot extending into the MLB from an edge thereof, having a length perpendicular to the edge that is greater than a width parallel to the edge.

8. The media processing device of claim 1, wherein the receiver is configured to send a signal to the controller indicating whether the radiation is detected.

* * * * *